US 11,524,771 B2

(12) United States Patent
Didey

(10) Patent No.: US 11,524,771 B2
(45) Date of Patent: *Dec. 13, 2022

(54) LANDING GEAR DRIVE SYSTEM

(71) Applicant: AIRBUS OPERATIONS LIMITED, Bristol (GB)

(72) Inventor: Arnaud Didey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 658 days.

This patent is subject to a terminal disclaimer.

(21) Appl. No.: 16/409,592

(22) Filed: May 10, 2019

(65) Prior Publication Data
US 2019/0263509 A1    Aug. 29, 2019

Related U.S. Application Data

(63) Continuation of application No. 15/788,721, filed on Oct. 19, 2017, now Pat. No. 10,329,012, which is a
(Continued)

(30) Foreign Application Priority Data

Aug. 7, 2014    (GB) ...................................... 1414051

(51) Int. Cl.
 *B64C 25/40*   (2006.01)
 *B64C 25/34*   (2006.01)
 *F16H 1/06*    (2006.01)

(52) U.S. Cl.
 CPC ............ *B64C 25/405* (2013.01); *B64C 25/34* (2013.01); *F16H 1/06* (2013.01); *Y02T 50/80* (2013.01)

(58) Field of Classification Search
 CPC ..... B64C 25/40; B64C 25/405; Y02T 50/823; F16H 1/06
 See application file for complete search history.

(56) References Cited

U.S. PATENT DOCUMENTS 3,005,510 A   10/1961   Phillips
3,542,318 A   11/1970   Ellsworth
(Continued)

FOREIGN PATENT DOCUMENTS

CN    1078772    11/1993
CN    1137305    12/1996
(Continued)

OTHER PUBLICATIONS

English translation of Notification of Reasons for Refusal for Japanese Application No. 2015-155820, 10 pages, dated Jun. 25, 2019.
(Continued)

*Primary Examiner* — Philip J Bonzell
(74) *Attorney, Agent, or Firm* — Nixon & Vanderhye P.C.

(57) ABSTRACT

The invention provides a drive system for rotating a wheel of an aircraft landing gear. The drive system includes a motor operable to rotate a drive pinion, and a driven gear adapted to be mounted to the wheel. The drive system has a first configuration in which the drive pinion is capable of meshing with the driven gear to permit the motor to drive the driven gear and a second configuration in which the drive pinion is not capable of meshing with the driven gear. The drive system includes a linear positioning actuator for moving the drive pinion relative to the driven gear. The positioning actuator has a first end and a second end, the first end having a pivotal connection with a pivot axis spaced at a fixed distance from an axis of rotation of the driven gear, and the second end having a pivotal connection with a pivot axis spaced at a fixed distance from an axis of rotation of the drive pinion.

35 Claims, 11 Drawing Sheets

Related U.S. Application Data continuation of application No. 14/821,249, filed on Aug. 7, 2015, now Pat. No. 9,821,905.

(56) References Cited

U.S. PATENT DOCUMENTS

| | | | | |
|---|---|---|---|---|
| 3,762,670 | A * | 10/1973 | Chillson | B64C 25/36 244/50 |
| 3,850,389 | A | 11/1974 | Dixon | |
| 5,426,476 | A | 6/1995 | Fussell et al. | |
| 5,823,026 | A | 10/1998 | Finke | |
| 6,168,113 | B1 | 1/2001 | Hann et al. | |
| 8,684,300 | B2 * | 4/2014 | Wilson | B64C 25/405 244/50 |
| 8,979,019 | B2 * | 3/2015 | Christensen | B64C 25/405 244/50 |
| 9,428,266 | B2 | 8/2016 | Wilson et al. | |
| 9,469,397 | B2 | 10/2016 | Didey | |
| 2006/0065779 | A1 | 3/2006 | McCoskey et al. | |
| 2012/0153075 | A1 * | 6/2012 | Wilson | B64C 25/405 244/50 |
| 2012/0217340 | A1 | 8/2012 | Essinger et al. | |
| 2012/0228921 | A1 | 9/2012 | Essinger et al. | |
| 2012/0312112 | A1 | 12/2012 | Tizac | |
| 2013/0026284 | A1 * | 1/2013 | Christensen | B64C 25/405 244/50 |
| 2013/0200210 | A1 | 8/2013 | Oswald et al. | |
| 2014/0158820 | A1 | 6/2014 | Wilson et al. | |
| 2014/0187370 | A1 | 7/2014 | Walsh | |
| 2014/0225421 | A1 | 8/2014 | Oswald et al. | |
| 2014/0245853 | A1 * | 9/2014 | Didey | F16H 1/06 74/421 A |
| 2014/0246539 | A1 * | 9/2014 | Didey | B64C 25/405 244/50 |
| 2015/0210385 | A1 * | 7/2015 | Didey | F16H 1/24 244/50 |
| 2016/0221668 | A1 | 8/2016 | Didey | |
| 2016/0221669 | A1 | 8/2016 | Didey | |
| 2017/0001718 | A1 | 1/2017 | Didey | |

FOREIGN PATENT DOCUMENTS

| | | | | |
|---|---|---|---|---|
| CN | 1708653 | | 12/2005 | |
| CN | 101216056 | | 7/2008 | |
| CN | 101949398 | | 1/2011 | |
| EP | 2527249 | | 11/2012 | |
| EP | 2551192 | | 1/2013 | |
| EP | 2551192 | A2 * | 1/2013 | B64C 25/405 |
| EP | 2860103 | | 4/2015 | |
| GB | 1061216 | | 3/1967 | |
| GB | 2523127 | A * | 8/2015 | B64C 25/34 |
| GB | 2523780 | A * | 9/2015 | B64C 25/405 |
| JP | 54-124893 | | 9/1979 | |
| JP | 58-142007 | | 8/1983 | |
| JP | 2-124304 | | 10/1990 | |
| JP | 5-22807 | | 3/1993 | |
| JP | 2012224332 | | 11/2012 | |
| RU | 47280 | | 8/2005 | |
| RU | 2278304 | | 6/2006 | |
| WO | 2011023505 | | 3/2011 | |
| WO | WO-2011023505 | A2 * | 3/2011 | B64C 25/405 |
| WO | 2011073587 | | 6/2011 | |
| WO | 2011073590 | | 6/2011 | |
| WO | 2011134503 | | 11/2011 | |
| WO | WO-2011023505 | A3 * | 11/2011 | B64C 25/405 |
| WO | 2012171589 | | 12/2012 | |
| WO | 2014023939 | | 2/2014 | |
| WO | 2014023941 | | 2/2014 | |
| WO | WO-2014023939 | A1 * | 2/2014 | B64C 25/34 |
| WO | WO-2014023941 | A1 * | 2/2014 | B64C 25/34 |
| WO | 2015040363 | | 3/2015 | |
| WO | 2015040370 | | 3/2015 | |
| WO | WO-2015040363 | A1 * | 3/2015 | B64C 25/34 |
| WO | WO-2015040364 | A1 * | 3/2015 | B64C 25/34 |

OTHER PUBLICATIONS

Helm, J. et al. "Locking Actuators Today and Beyond", SAE Technical Paper 881434 (1988) (16 pages).
European Search Report for EP Application No. 15179966.5 dated Dec. 8, 2015 (6 pages).
English Translation of Chinese First Office Action issued in Chinese Patent Application No. 201510474789.9, 12 pages, dated Oct. 31, 2018.
International Search Report and Written Opinion in International Application No. PCT/GB2014/052713, 11 pages, dated Jan. 7, 2015.
Russian Office Action and its English translation for Russian Application No. 2015132882, nine pages, dated Feb. 21, 2019.
English Translation of Chinese Office Action cited in CN Application No. 201510474789.9, dated Apr. 17, 2019, 13 pages.

* cited by examiner

LANDING GEAR DRIVE SYSTEM

RELATED APPLICATIONS

The present application is a Continuation of U.S. application Ser. No. 15/788,721, filed Oct. 19, 2017, which is a continuation of U.S. application Ser. No. 14/821,249 filed Aug. 7, 2015, now U.S. Pat. No. 9,821,905, issued Nov. 21, 2017, which claims priority from Great Britain Application Number 1414051.1, filed Aug. 7, 2014. The disclosures of all of the above-listed prior applications are hereby incorporated by reference herein in their entirety.

FIELD OF THE INVENTION

The present invention relates to drive systems for rotating one or more wheels of an aircraft landing gear for the purposes of ground taxiing and/or spin-up prior to landing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, and/or for applying braking torque to the rotating wheels) by converting kinetic energy to electrical energy using the drive system motor as a generator.

Several autonomous ground taxi systems for both driving the wheels while the aircraft is on the ground and spinning them up prior to landing have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

A prior art arrangement which is not restricted to nose landing gears is described in WO2011/023505. The disclosed system uses an actuator to move a drive pinion in and out of driving engagement with a driven gear mounted to the wheel hub. WO2014/023939 describes a further prior art arrangement, similar in many respects to WO2011/023505, in which one of the drive pinion and the driven gear comprises a sprocket, and the other of the drive pinion and the driven gear comprises a series of rollers arranged to form a ring, each roller being rotatable about a roller axis at a fixed distance from an axis of rotation of the drive pinion or driven gear, respectively.

SUMMARY OF THE INVENTION

A first aspect of the invention provides a drive system for rotating a wheel of an aircraft landing gear, the drive system including a motor operable to rotate a drive pinion, and a driven gear adapted to be mounted to the wheel, wherein the drive system has a first configuration in which the drive pinion is capable of meshing with the driven gear to permit the motor to drive the driven gear and a second configuration in which the drive pinion is not capable of meshing with the driven gear, and the drive system further comprises a linear positioning actuator for moving the drive pinion relative to the driven gear, wherein the positioning actuator has a first end and a second end, the first end having a pivotal connection with a pivot axis spaced at a fixed distance from an axis of rotation of the driven gear, and the second end having a pivotal connection with a pivot axis spaced at a fixed distance from an axis of rotation of the drive pinion.

The term "wheel" of the aircraft landing gear is used here in its conventional sense to refer to a ground wheel which contacts the ground surface when the aircraft is supported by the ground and is not airborne. The term "motor" is used here in its conventional sense to refer to a machine whereby some source of energy (e.g. electric, pneumatic, hydraulic, etc.) is used to give motion. It is to be understood that the motor may be a motor-generator, which, in addition to its function as a motor, is operable as a generator whereby mechanical energy is converted into electrical energy. The terms "drive" and "driven" are used here with reference to the "drive pinion" and the "driven gear" refer to convey the sense of power transfer when the motor is operable to rotate the wheel of the aircraft landing gear. It will, of course, be appreciated that where the motor is a motor-generator and is acting as a generator the "driven gear" will in fact be the driving element which drives the "drive pinion" and therefore the generator. The generator may be used to apply a braking torque to the wheel.

The positioning actuator may include an hydraulic cylinder.

The hydraulic cylinder may be dual acting.

Alternatively, the hydraulic cylinder may be single acting. For example, the hydraulic cylinder may have an annular section on one side of a piston and a cylindrical section on the other side of the piston, and the cylindrical section is un-pressurized. The un-pressurized section may be vented via a liquid tight gas permeable membrane.

Alternatively, the hydraulic cylinder may have a first rod and a second rod forming two annular sections between the first and second rods, the two annular sections are fluidly coupled to a single hydraulic port. The two annular sections may have dissimilar areas.

The positioning actuator may be a self-locking actuator. The self-locking actuator may be arranged to lock the drive system in the second configuration.

The drive system may further comprise a locking device external to the positioning actuator for locking the drive system in the second configuration.

An unlocking actuator may be arranged to release the locking device. The unlocking actuator may be configured to release the locking device when the positioning actuator is commanded to move the drive pinion from the second configuration to the first configuration. The unlocking actuator may include an hydraulic cylinder.

Where the unlocking actuator and the positioning actuator are both hydraulic, they may be coupled to a common hydraulic supply.

The locking device may include a mechanical locking lever.

The locking device may include a hook pivotally mounted on the aircraft landing gear and a pin spaced at a fixed distance from the axis of rotation of the drive pinion, wherein the hook is moveable between a locked position in which the pin is held captive by the hook, and an unlocked position in which the pin moves relative to the hook.

The locking device may further comprise a latch moveable between a locked and an unlocked position, where the latch in the locked position engages the hook and prevents pivotal movement of the hook, and the latch in the unlocked position permits pivotal movement of the hook.

The unlocking actuator may be coupled to the latch for disengaging the latch from the hook.

The positioning actuator may be hack-driveable.

A drive system may further comprise a biasing element for biasing the drive system to the second configuration. The biasing element may include at least one spring, e.g. a torsion spring, a leaf spring, a compression spring, or the like. In the case of a compression spring a guide may be provided to restrain the spring to avoid buckling of the spring.

One of the drive pinion and the driven gear may comprise a sprocket and the other of the drive pinion and the driven gear may comprise a series of rollers arranged to form a ring, each roller being rotatable about a roller axis at a fixed distance from an axis of rotation of the drive pinion or driven gear, respectively.

The wheel may be driveable for taxiing the aircraft or ground and/or spinning-up the wheel prior to landing.

The motor may be a motor/generator which, when operating as a generator, is configured to apply a braking torque to the wheel.

The driven gear may be adapted to be mounted to a hub of the wheel, for example to an outer rim of the hub.

A further aspect of the invention provides an aircraft landing gear having a drive system as described.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
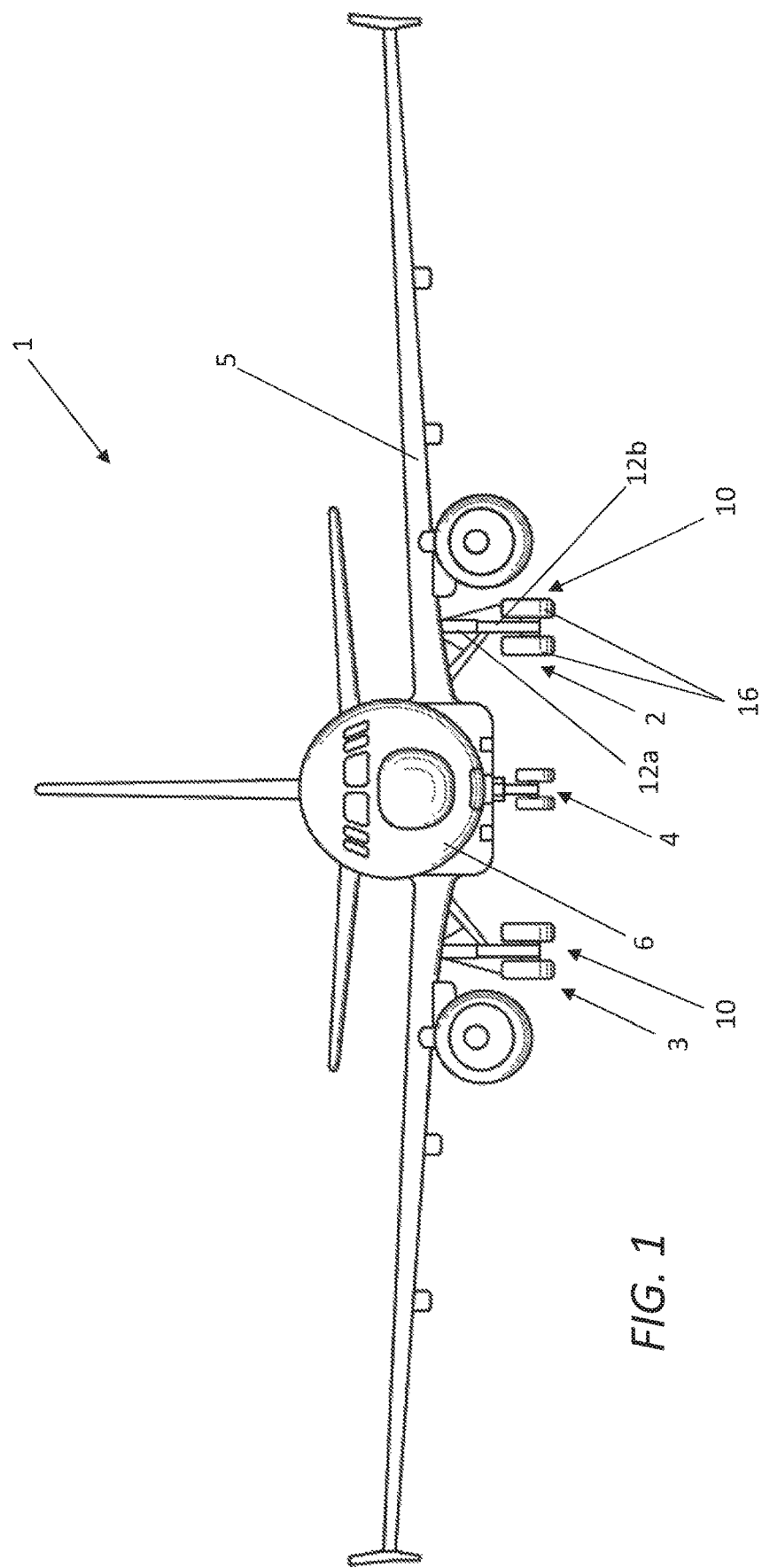
FIG. 1 shows a front view of an aircraft having the drive system.

A first embodiment of the invention is shown in FIGS. 1 to 6. As shown in FIG. 1 the aircraft 1 has left and right main landing gear 2, 3 and a nose landing gear 4. The landing gear each have two wheels (a diablo configuration), but the principles of the embodiment may be applied to landing gear with any number of wheels, e.g. a single wheel, or four or more wheels.

The landing gear drive system is arranged for driving the main landing gear a landing gear attached to wing structure or fuselage structure in the region of the wings), since the weight supported by the main landing gear is considered to provide the best traction between the wheels and the ground to enable reliable aircraft ground taxiing. However, the drive system may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc. in the subsequent figures the landing gear having the drive system is indicated generally as item 10.

Figure 2:
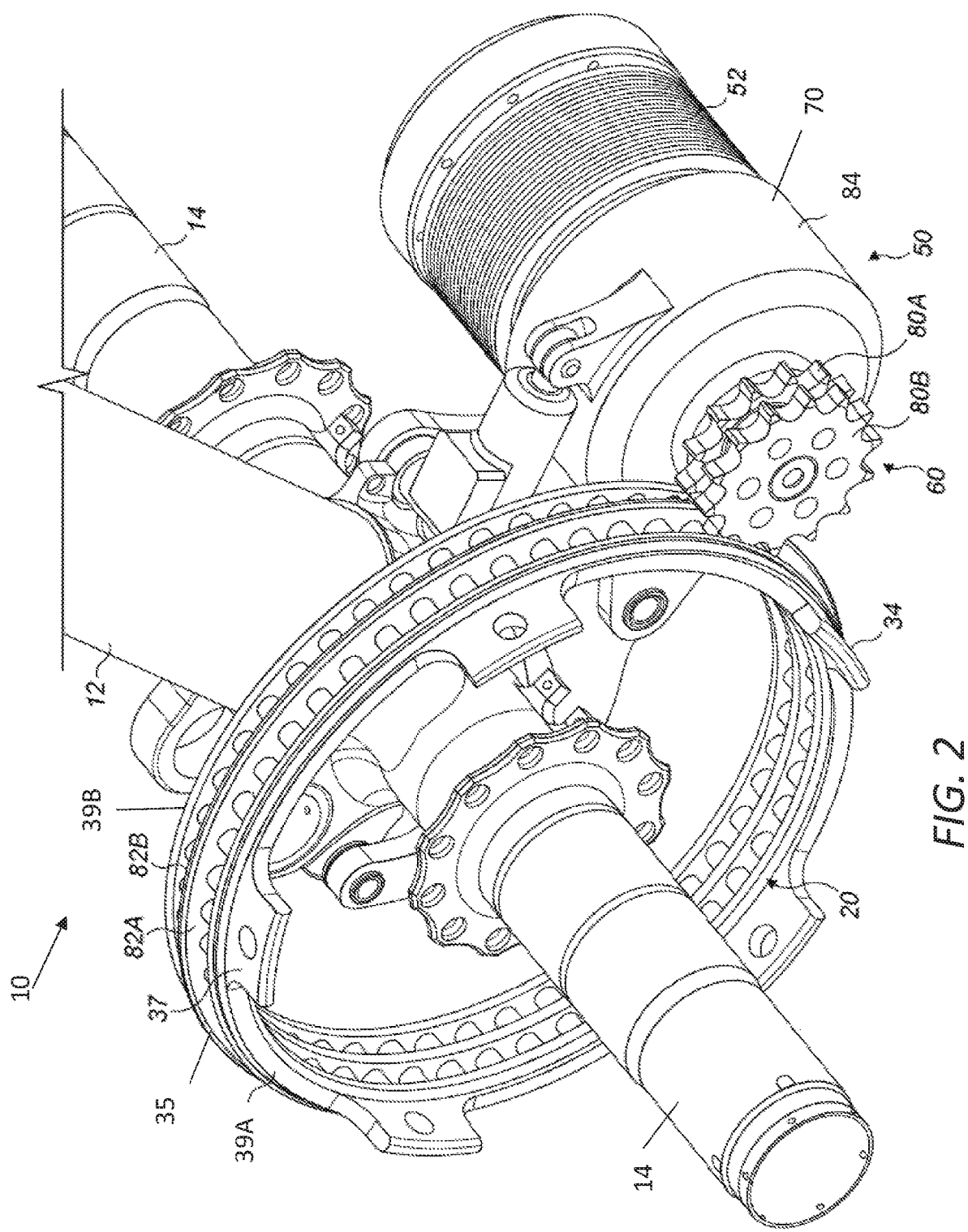
FIG. 2 shows an isometric view of a drive system according to one embodiment.

The landing gear 10 shown in FIG. 2 includes a telescopic shock-absorbing main leg 12, including an upper telescopic part 12a (main fitting) and a lower telescopic part 12b (slider). The upper telescopic part 12a is attached to the aircraft wing 5 by its upper end. In other embodiments the upper telescopic part may be attached to the aircraft fuselage 6 or to the wing and fuselage. The lower telescopic part 12b supports an axle 14 carrying a pair of wheels 16 (removed in FIG. 2 for clarity), one on either side of the main leg. The wheels 16 are arranged to rotate about the axle 14 to enable ground movement of the aircraft, such as taxiing or landing.

Each wheel 16 comprises a tyre 17 supported by a hub 18. Each wheel hub 18 has a rim 19 for holding the tyre. A landing gear wheel drive system 50 includes a driven gear 20 attached to the hub 18 so as to be rotatable with the wheel 16. In the illustrated embodiment the driven gear 20 comprises a roller gear 34 by a rigid annular ring 35 and a series of pins (not shown) projecting from both sides of the annular ring 35. A first series of rollers 82A rotatably supported by the pins is provided on one side of the annular ring 35, and a second series of rollers 82B rotatably supported by the pins is provided on the other side of the annular ring. Each series of rollers 82A, 82B extend around the annular ring to form a continuous track. First and second lateral annular rings 39A, 39B sandwich the first and second series of rollers 82A, 82B. The pins supporting the first series of rollers 82A extend between the annular ring 35 and the first lateral annular ring 39A, and the pins supporting the second series of rollers 82B extend between the annular ring 35 and the second lateral annular ring 39B. The annular ring 35 therefore forms a central spine for supporting the pins which are cantilevered off the central spine.

The first lateral annular ring 39A comprises a plurality of connection extension tabs 37 which provide a rigid connection to the hub 18. Alternatively, a flange forming a continuous extension rim, with or without cut outs, projecting axially from the inner diameter of the annular ring 39A may be used to provide the rigid connection to the hub 18. The driven gear-to-hub interface may be a rigid attachment or alternatively may include a flexible interface, e.g. a rubber bushing, to permit some angular deflection of the driven gear with respect to the wheel hub to accommodate deflections of the landing gear structure and to isolate the driven gear from wheel deformation loads.

The drive system 50 further comprises a motor 52 which is configured to rotate a drive pinion 60 via a gearbox 70. In the illustrated embodiment the drive pinion 60 is a wheel-type sprocket comprising multiple co-axial sprockets 80A, 80B each with radially-extending teeth. The respective co-axial sprockets 80A, 80B of the drive pinion 60 are able to mesh with the co-axial rings of rollers 82A, 82B of the driven gear 20. The groove between the sprockets 80A, 80B may be in rolling contact with the outer diameter of the central spine (annular ring 35) of the roller gear 34. The rolling contact is preferably at the pitch radius of the rollers.

In the illustrated embodiment, the drive system 50 drives only one of the wheels 16 on each landing gear 10. However, it is intended that one drive system 50 may alternatively be provided for each wheel 16. For a landing gear with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft 54 of each drive system via a differential to permit the driven wheels to rotate at different speeds when the aircraft executes a turn whilst on the ground.

In the illustrated embodiment the gearbox 70 is an epicyclic reduction gearbox which provides a drive path between the motor 52 and the drive, pinion 60. The motor is an electric motor which drives an input shaft of the drive path. An output shaft (or drive shaft) of the drive path is coaxial with the input shaft and is also coaxial with the axis of rotation of the motor. The drive pinion 60 is mounted on the output shaft.

Figure 3:
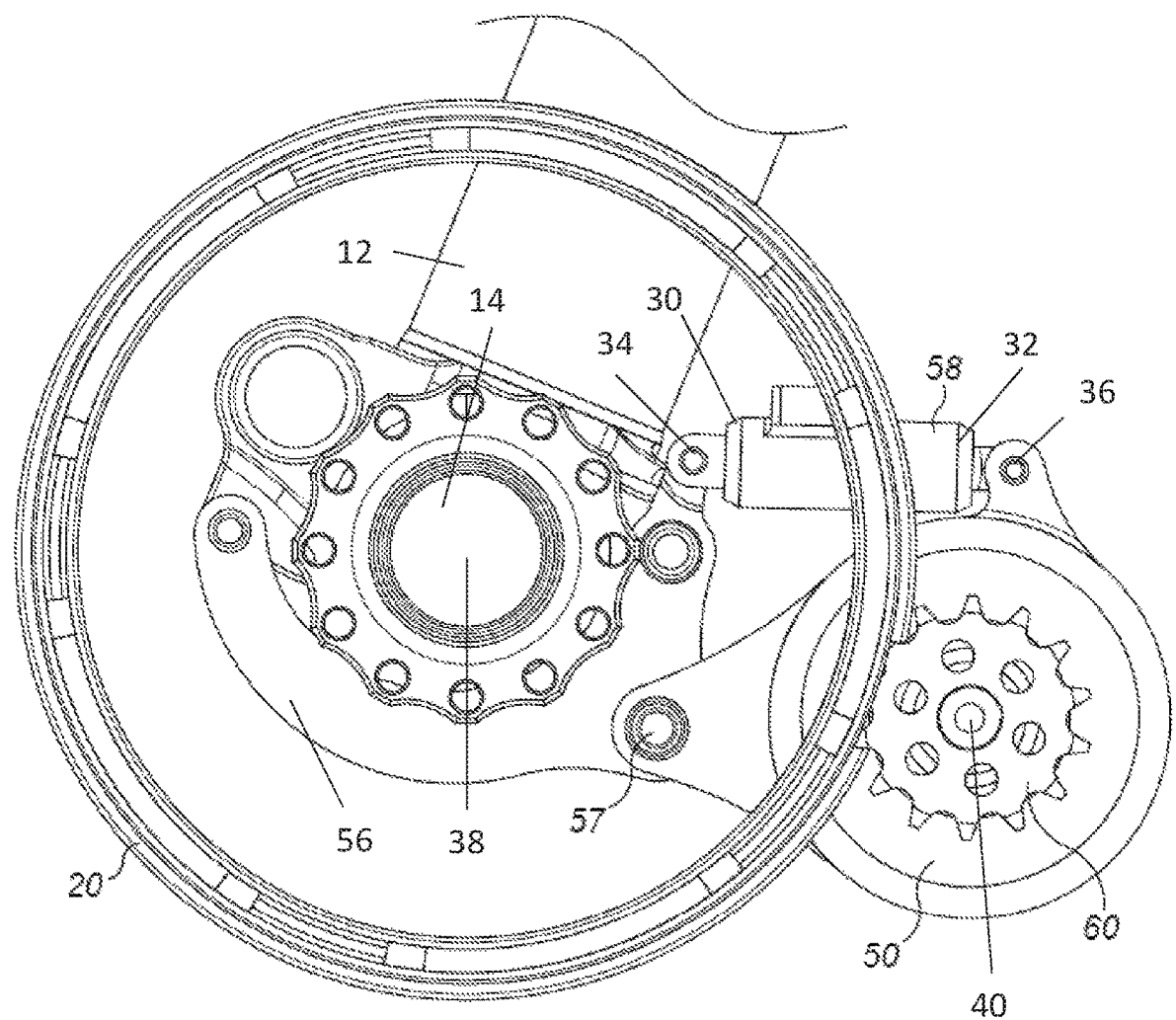
FIG. 3 shows a side view of the drive system of FIG. 2 in an engaged position.
Figure 6:
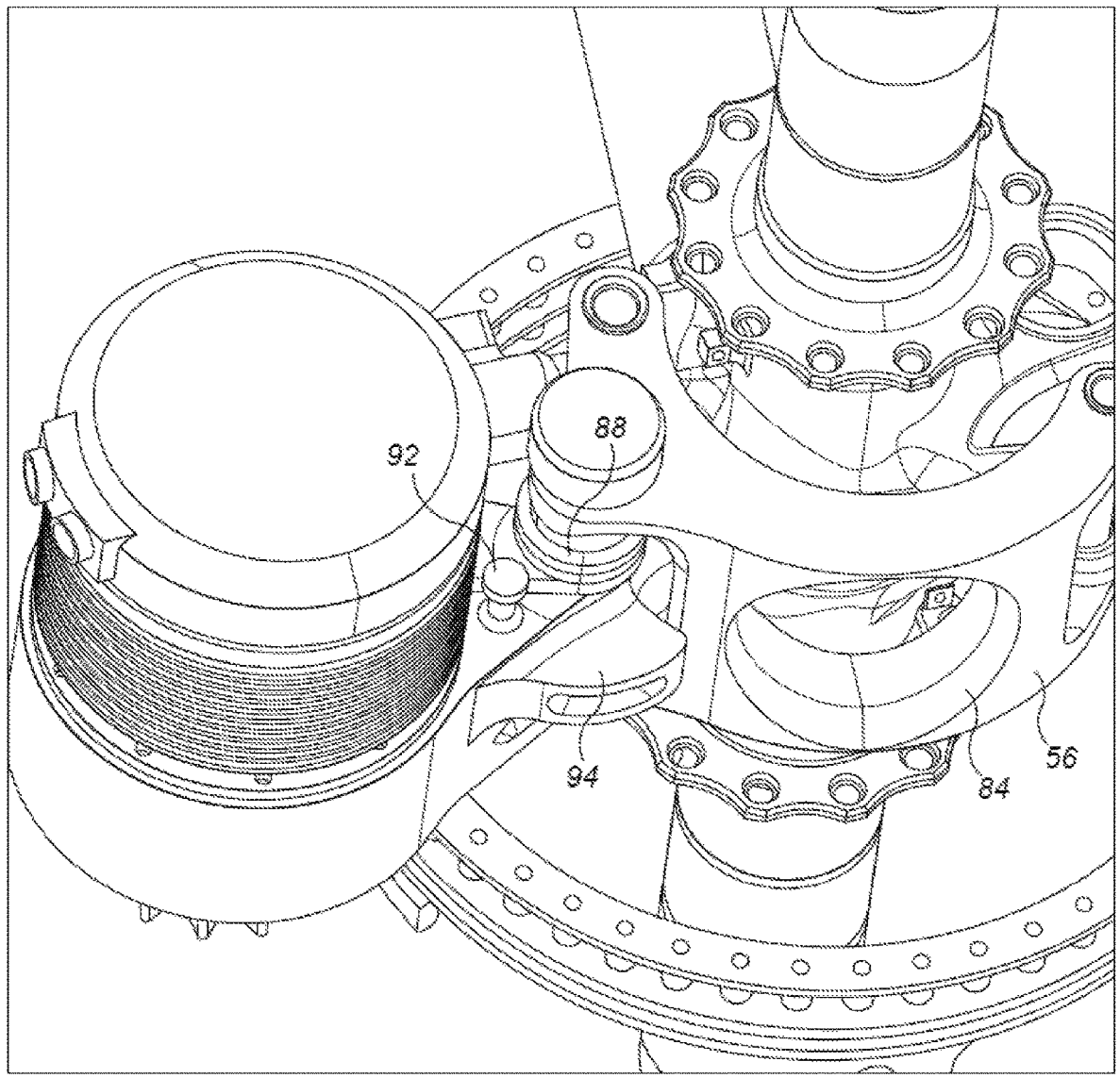
FIG. 6 shows an isometric view from below of the drive system of FIG. 2.

The drive system 50 is supported by a bracket 56, as shown in FIG. 3, which is rigidly connected to the base of slider 12b and pivotally connected to the motor 52 about a pivot axis 57. The mounting bracket 56 extends beneath the axle 14 and is attached by mounting pins to aft and fore mounting points respectively on the slider. The mounting pins permit ready detachment of the bracket from the landing gear. The drive system 50 may alternatively be mounted on the upper telescopic part 1:2a (main fitting) or on the axle 14. As shown in FIG. 6 the bracket 56 includes an aperture 84 providing access to a jacking point at the base of the slider.

The gearbox 70 has a housing (or casing) 84 to which the motor 52 is fixed on one side and from which the output shaft having the drive pinion 60 projects on the opposite side. The housing 84 has a projecting lug which is pivotally connected at 57 to the mounting bracket 56. The motor 52 and gearbox 70 are encased within a housing to protect the components therein from environmental contamination by debris etc which may cause malfunction.

Figure 4:
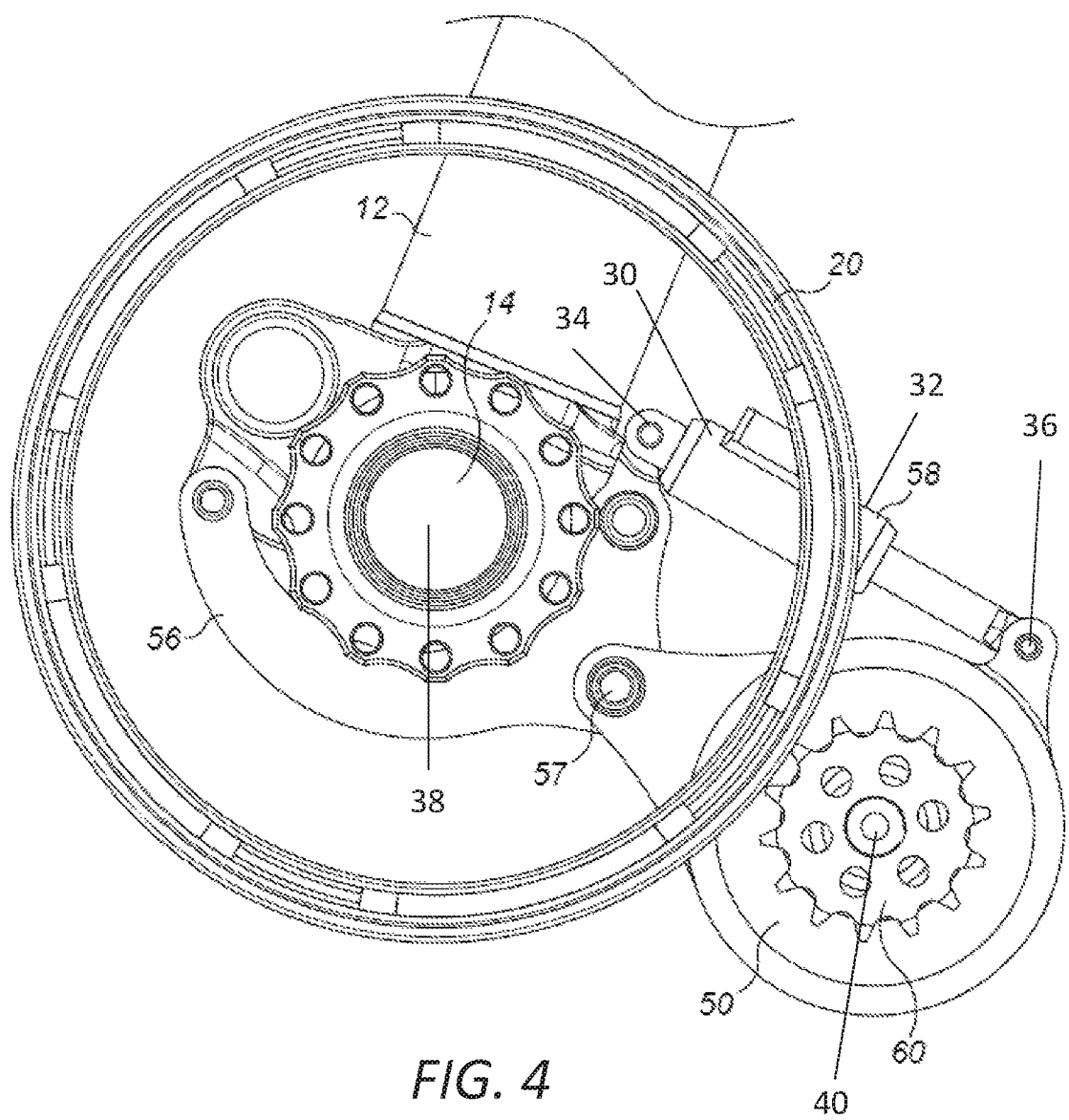
FIG. 4 shows a side view of the drive system of FIG. 2 in a disengaged position.

A linear positioning actuator 58 extends between the bracket 56 (at an end nearest the axle 14) and the motor 52. The positioning actuator has a first end 30 and a second end 32. The first end 30 having a pivotal connection with a pivot axis 34 spaced at a fixed distance from an axis of rotation 38 of the driven gear 20, and the second end 32 having a pivotal connection with a pivot axis 36 spaced at a fixed distance from an axis of rotation 40 of the drive pinion 60. Thus, linear movement of the actuator 58 is translated to rotational movement of the drive pinion 60 about the pivot 57, more specifically movement of the rotational axis of the drive pinion about the pivot 57. The drive pinion 60 can thus be rotated between a first configuration in which the drive pinion (sprocket) 60 engages the driven gear (roller gear 34) (FIG. 3) and a second configuration in which the drive pinion 60 does not engage the driven sear (FIG. 4).

The positioning actuator 58 may be an hydraulic actuator, an electro-mechanical actuator (EMA), or an electro-hydraulic actuator (FHA), for example.

Figure 5:
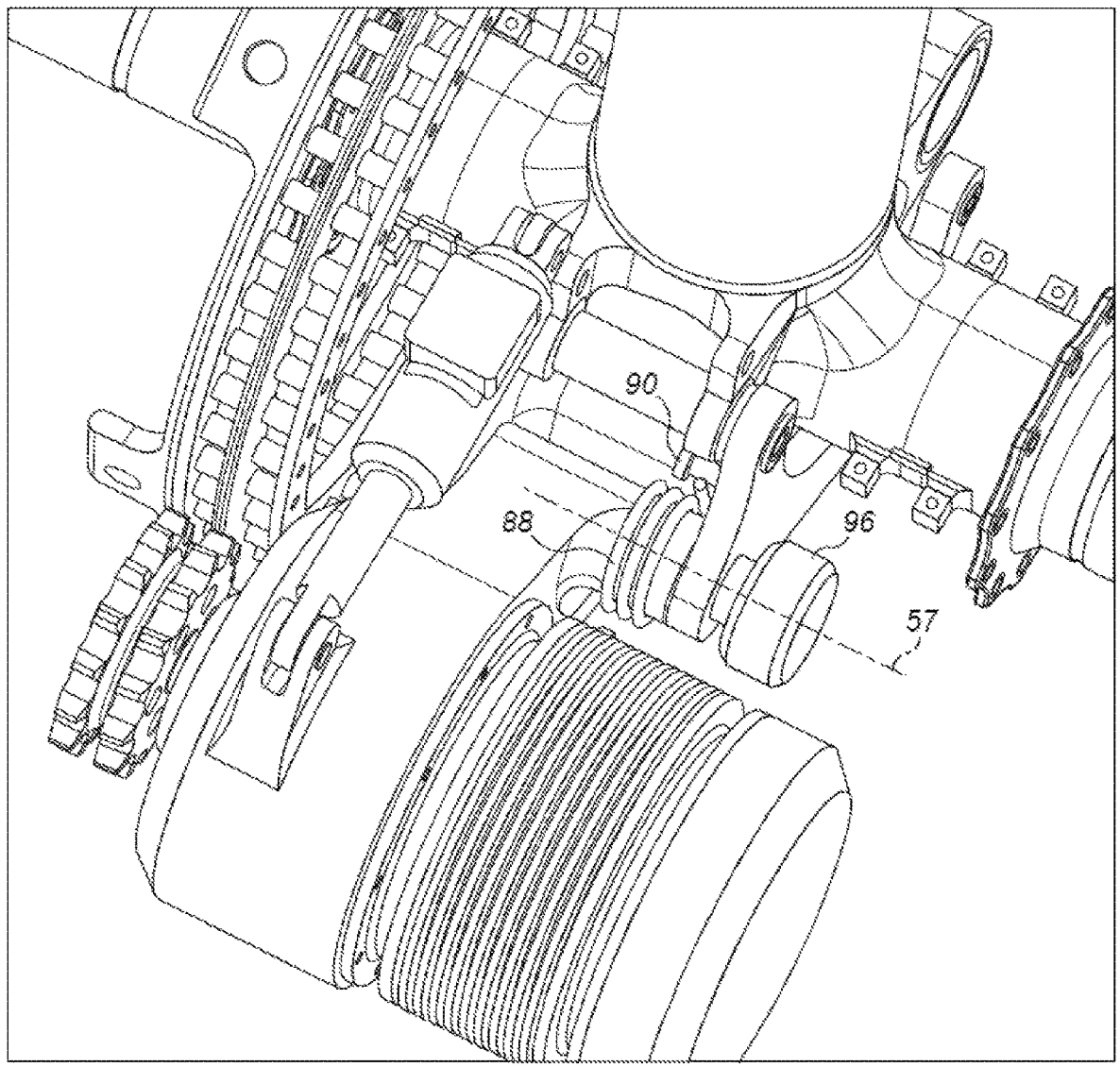
FIG. 5 shows an isometric view from above of the drive system of FIG. 2.

As best shown in FIGS. 5 and 6 the drive system 50 is biased to the second (disengaged) configuration, firstly by gravity (when the aircraft is not inverted) and secondly by a biasing element, which in this embodiment is a torsion spring 88. The torsion spring 88 is substantially formed as a coil centred on the pivot axis 57. The spring 88 has a first flying end which bears against a pin 90 projecting from the bracket 56 and has a second flying end which bears against a pin 92 projecting from the drive system 50. Under the biasing forces of the spring and gravity an end stop 94 extension on the drive system 50 bears against the bracket 56 on the underside of the landing gear to prevent over rotation of the drive system 50 about the pivot axis 57.

The linear actuator 58 may be force controlled (or current controlled) to apply a substantially constant load between the drive pinion 60 and the driven gear 20, thereby allowing for some deformation of the various component parts of the drive system 50 while at the same time preventing unwanted separation. The load rating takes account of vibration and shock loads, and the geometry/kinematics of the system can be optimized to further reduce loads on actuator and/or bearings.

The actuator 58 may be force controlled using the motor torque demand to comply with deflections/deformation of the final transmission between the drive pinion 60 and driven gear 20. Force feedback may be used to control the actuator position in closed loop. Force feedback may not be required and the actuator may be controlled in open loop, limiting sensor requirement and improving system reliability. The load may be set as a function of the motor torque plus a margin to ensure secure meshing engagement but so as to limit wear. An actuator position sensor may be needed to confirm whether the actuator is engaged or disengaged. A rotary position sensor 96, such as a rotary variable differential transformer, or a linear position sensor (not shown), such as a linear variable differential transformer, embedded within the actuator may be used by the control loop of the actuator during engagement.

Additionally or alternatively a mechanical stop may be used to prevent excessive load being imposed by the drive pinion on the driven gear. The stop may be provided in the positioning actuator or between the motor/gearbox and the bracket.

During engagement, the inertia (speed) of drive pinion 60 and driven gear 20 would be matched using available motor speed feedback (for sprocket speed) and either the aircraft tachometer (not shown) or an independent roller-gear speed sensor, such as an inductive sensor using the rollers as target, may be used.

The hydraulic positioning actuator may be preferred since the load imparted onto the driven gear 20 by the drive pinion 60 in the engaged configuration may be more compliant than with either an EHA or EMA. This compliance may beneficially provide load control and damping to avoid overloading the driven gear and sprocket engagement. The positioning actuator is preferably back-driveable such that in the event of failure in the positioning actuator, or its control, the drive system returns to the second configuration. In addition, the actuator 58 may include a lock down device to hold the drive system in the second (disengaged) configuration during take-off, landing and flight. The positioning actuator and lock-down will be described in greater detail below with reference to FIGS. 8 to 14.

Whilst in the drive system of FIGS. 2 to 6 the drive pinion 60 is arranged as a sprocket have two coaxial rows of sprocket teeth and the driven gear 20 is arranged as a roller gear having two coaxial rows of rollers, and the gearbox 70 is an epicyclic gearbox, it will be appreciated that other drive systems may be embodied differently.

Figure 7:
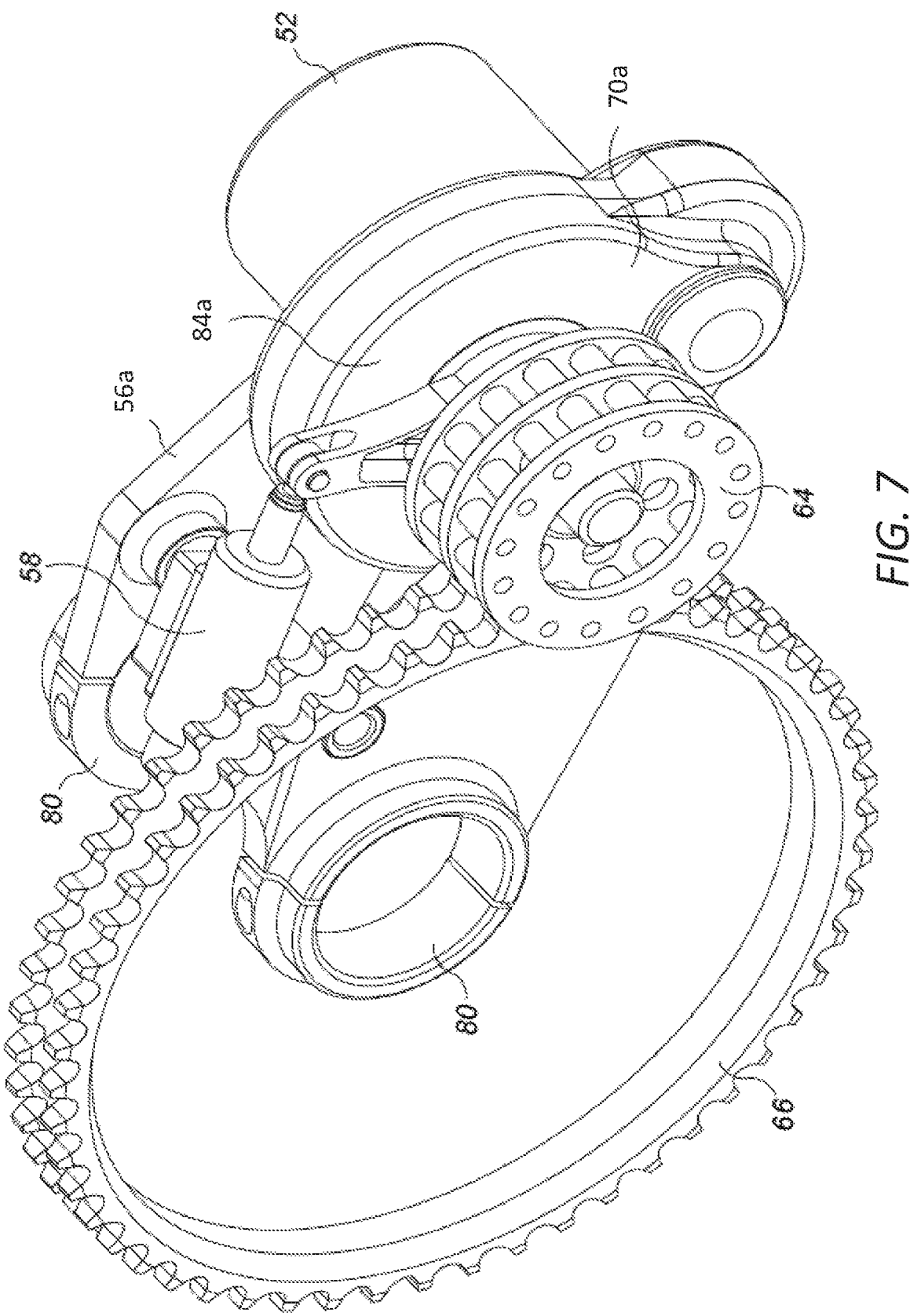
FIG. 7 shows an isometric view of a drive system according to another embodiment.

For example, in the embodiment shown in FIG. 7 the sprocket (drive pinion) 60 is replaced by a roller gear drive pinion 64 having two co-axial rings of rollers and the roller gear 34 (driven gear) is replaced by sprocket 66 having two coaxial rings of sprocket teeth. The roller gear 64 may be constructed similarly to the roller gear 34, although of course it has a much smaller diameter and therefore fewer rollers. The roller gear in either embodiment may alternatively be formed as a roller chain or roller gear having a single ring of rollers for engaging with a driven gear formed as a sprocket (not shown) having a single row of sprocket teeth. The drive pinion and drive gear may further alternatively be formed as spur gears or other type of toothed gear moveable into and out of meshing engagement by the positioning actuator 58.

Also in the embodiment shown in FIG. 7, the epicyclic gearbox 70 is replaced by a parallel axis gearbox 70*a*. In this embodiment the bracket 56*a* includes two lugs comprising half-moon clamps to permit ready attachment and detachment of the bracket 56*a* to the axle 14. The motor 52 is fixedly connected, e.g. by bolting, to the bracket 56*a*. The gearbox 70*a* is a two stage parallel axis gearbox with meshing spur gears at each reduction stage.

The two stage parallel axis gearbox 70*a* is encased within a housing 84*a* mounted for pivotal rotation with respect to the bracket 56*a*. In this way, it becomes possible to fix the motor 52 to the bracket 56*a* whilst permitting the gearbox 70*a* to rotate with respect to the bracket 56*a*. The mass moved by the positioning actuator 58 is therefore less than for the embodiment of FIGS. 2 to 6 where the motor and the epicyclic gearbox 70 are both moved by the positioning actuator 58. Of course, an epicyclic gearbox may be used instead of the parallel axis gearbox in the FIG. 7 embodiment, and the parallel axis gearbox may be used instead of the epicyclic gearbox in the FIGS. 2 to 6 embodiment. The epicyclic gearbox is neater in design terms but the parallel axis gearbox allows greater freedom in design to adjust the angles between the pinion axis of rotation and the pivot axis 57.

Whilst in the illustrated embodiments the driven gear and the drive pinion have multiple coaxial rows of rollers/sprockets, it will be appreciated that either one or three or more co-axial rows of rollers/sprockets may alternatively be provided. Increasing the number of rows of rollers/sprockets decreases the load on each roller/sprocket row.

Figure 13:
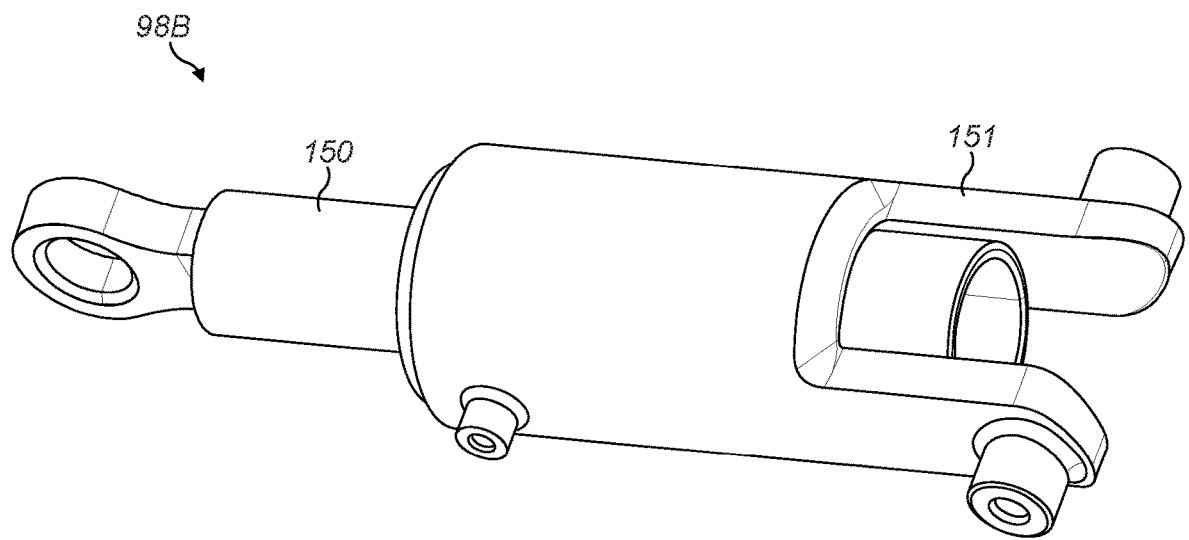
FIG. 13 shows an isometric view of an alternative single acting hydraulic positioning actuator for the drive system.

Similar to the arrangement shown in FIG. 13, the driven gear 20 of the third embodiment may be fixed to the wheel via a flexible interface, e.g. a rubber bushing, to isolate the driven gear from wheel deformation loads.

In the illustrated embodiments where the landing gear 10 has two wheels, only one of which is driven, the driven wheels of the aircraft will likely be the outer wheels of the two landing gears with respect to the aircraft centreline. Alternatively, the inner wheels may be driven. It is unlikely that one inner and one outer wheel would be driven, although this is of course a possibility. Where only outer wheels, or only inner wheels, are driven then the drive system may need to be handed which has cost implications. To maximise commonality of parts the drive system 50 could comprise attachment lugs for the actuator 58 on both sides of the epicyclic gearbox, and the end stop 94 may also be provided on both sides. With these minor modifications the drive system 50 could be handed for both sides of the aircraft. The use of an epicyclic gearbox may be preferable over the parallel axis gearbox for this purpose.

Figure 8:
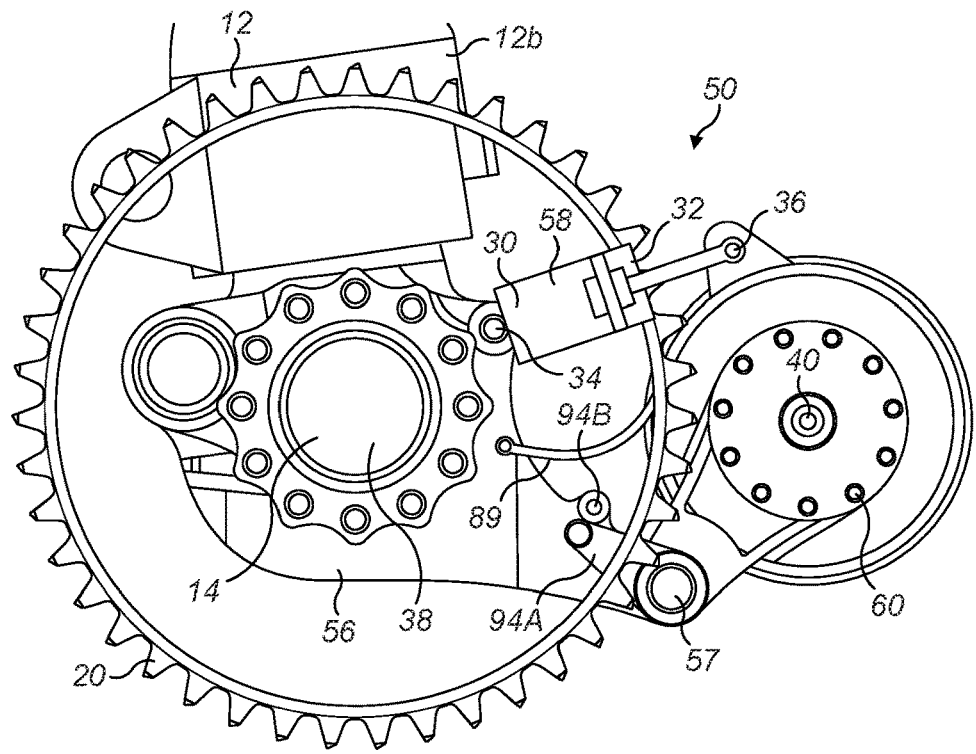
FIG. 8 shows a side view of a of a drive system according to yet another embodiment.

FIG. 8 illustrates an alternative embodiment in which the biasing element is arranged as a leaf spring 89, rather than the torsion spring 88 shown in FIG. 5. The leaf spring 89 is pivotally connected at one end to the bracket 56 and is pivotally connected at its opposite end to the motor/gear box housing. The leaf spring 89 extends across and above pivot 57. A stop 94A fixed with respect to the motor/gearbox bears against a corresponding stop 94B on the bracket 56 to prevent over-rotation of the motor/gearbox about pivot 57 when the drive system 50 is moved to the second (disengaged) configuration.

Figure 9:
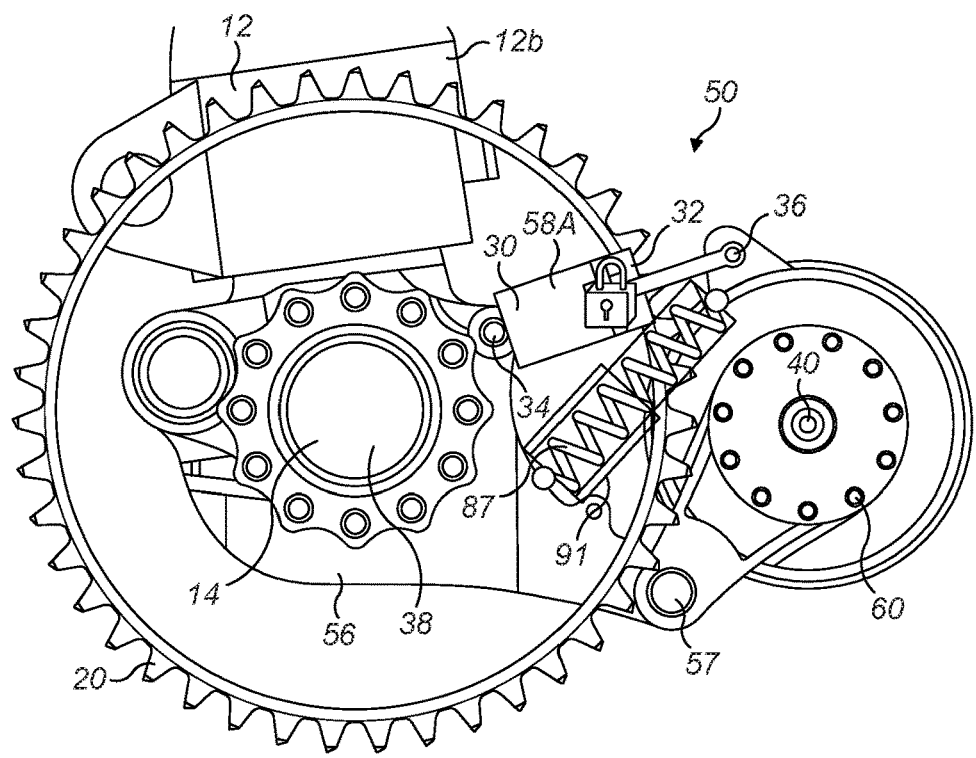
FIG. 9 shows a side view of a drive system according to yet another embodiment.

FIG. 9 illustrates an alternative embodiment in which the biasing element is arranged as a compression spring 87. The compression spring is pivotally connected at one end to the bracket 56 and is pivotally connected at its opposite end to the motor/gear box housing of the drive system 50. The compression spring is restrained by a telescoping guide 91 to avoid bucking of the compression spring when the drive system is moved to the first (engaged) configuration.

In the embodiment shown in FIG. 9 the positioning actuator is arranged as a self-locking positioning actuator 58A. The self-locking actuator may be an hydraulic actuator, an electromechanical actuator (EMA), or an electrohydraulic actuator (EHA) similar to the positioning actuator 58 described above. The self-locking actuator 58A differs from the actuator 58 in that the actuator self-locks in the extended position, which corresponds to the disengaged second configuration of the drive system 50. The self-locking actuator unlocks as the actuator is commanded to retract. Various self-locking actuators are known in the art and may be used for this purpose. Where the self-locking actuator is an hydraulic actuator, the locking mechanism may comprise a ball lock, a finger lock, a single stage segment lock or a ring lock, for example, such as described in SAE Technical Paper 881434, "Locking actuators today and beyond", Helm J et al, 1988. In the case of an hydraulic self-locking actuator the locking mechanism unlocks when hydraulic pressure is applied to the actuator. Similar types of self-locking mechanism may be used in combination with an electrohydraulic actuator or an electromechanical actuator. In the case of an electromechanical actuator unlocking the self-locking mechanism within the actuator may be affected mechanically rather than hydraulically.

The provision of a self-locking actuator ensures the motor/gearbox of the drive system 50 remains positively locked in the second (disengaged) configuration. The return spring load of the compression spring 87 (or the leaf spring 89 or torsion spring 88 which may be used in the alternative) and the load on the positioning actuator 58A is advantageously low due to the mechanical advantage attained through the orientation of these components with respect to the pivot axis 57. However, self-locking actuators suffer the disadvantage that the locking mechanism cannot readily be inspected and so a fault monitoring and detection system may be required, adding weight, cost and complexity. Depending on the type of locking mechanism used, it may not be possible to monitor and detect all potential faults, so a redundant system may be required also.

In the embodiments depicted in FIGS. 8 and 9 the hydraulic actuator 58, 58A has a cylindrical section nearest the end 30 and an annular section nearest the end 32 on opposite sides of the piston. Engagement of the drive systems 50 is effected by retracting the hydraulic actuator 58, 58A by pressurising the annular section of the actuator. As a result the hydraulic actuator is dual acting such that either the cylindrical or annular sections can be pressurised for extension and retraction of the actuator. Dual acting hydraulic actuators require two hydraulic lines making them heavier and more complex in control than single acting hydraulic actuators. Typically when one section is pressurized the other section is depressurized by connecting it to a low pressure return line.

Figure 10:
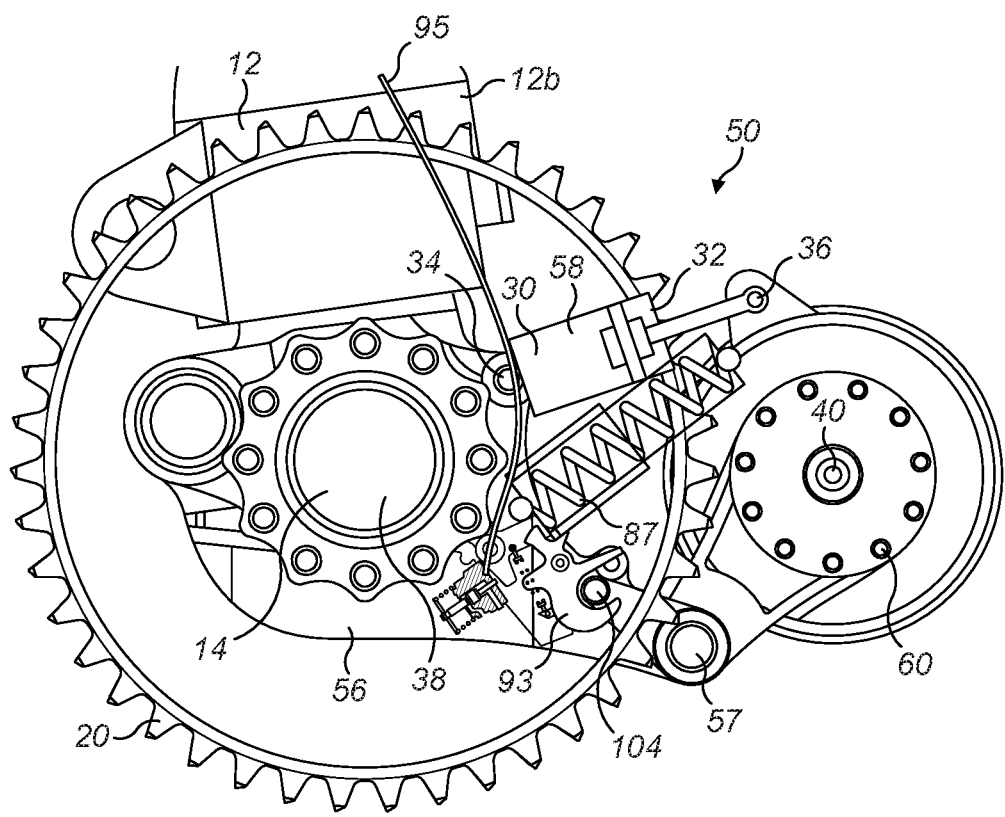
FIG. 10 shows a side view of a drive system according to yet another embodiment.

An alternative to the self-locking positioning actuator 58A is to provide the (non-self-locking) positioning actuator 58 with an external locking mechanism. FIG. 10 illustrates an alternative embodiment in which an external locking device 93, configured as a self-latching hook and pin locking mechanism, is provided. Of course, the external locking device 93 may be used in combination with the self-locking actuator 58A to provide a further level of redundancy.

Figure 11:
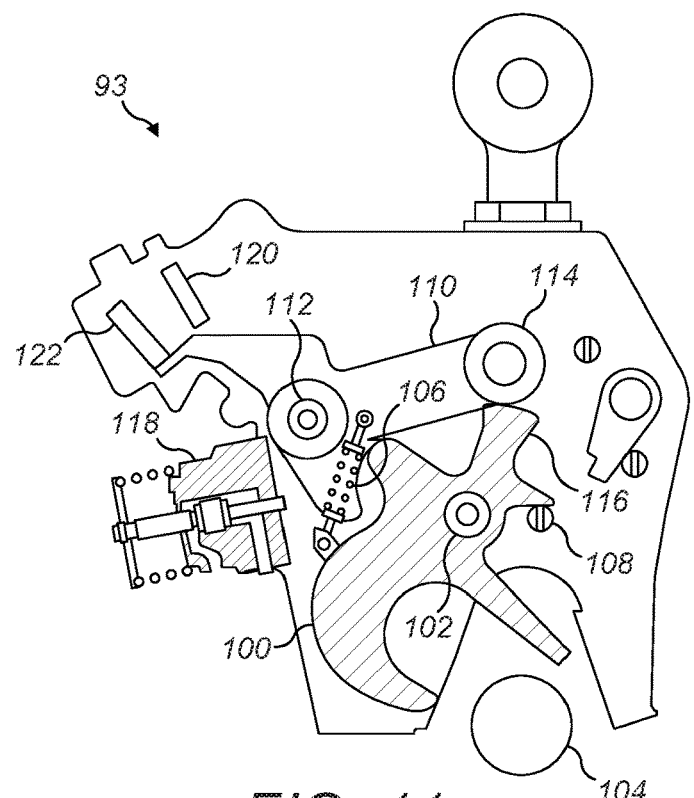
FIG. 11 shows a side view of an external locking device of the drive system of FIG. 10 in its open position.
Figure 12:
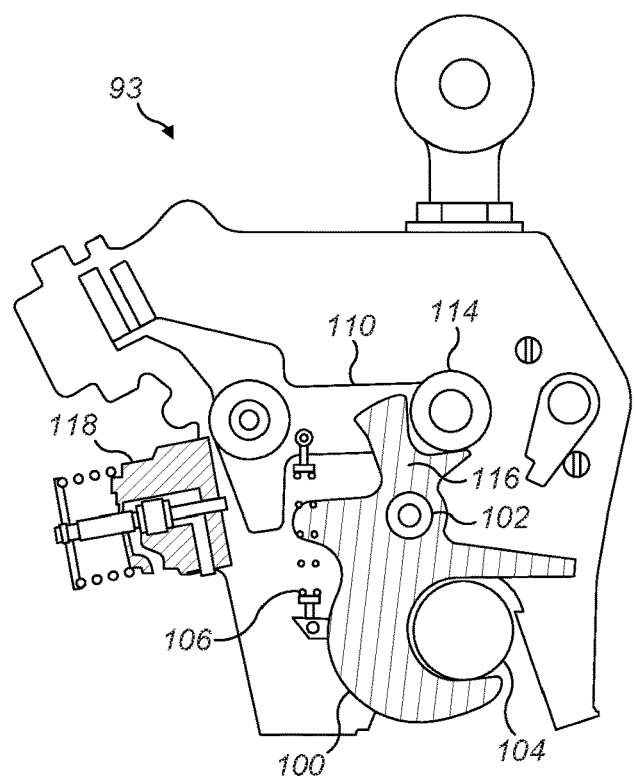
FIG. 12 shows a side view of an external locking device of the drive system of FIG. 10 in its closed position.

The external locking device 93 is shown in greater detail in FIGS. 11 and 12. The self-latching hook and pin locking mechanism comprises a hook 100 pivotally mounted about pivot 102. The hook 100 has jaws which engage with a pin 104 fixed to a lever arm for movement with the motor/gearbox about pivot 57. FIG. 11 illustrates the external locking device 93 in the open position and FIG. 12 illustrates the locking device 93 in the closed position. The open position corresponds to the engaged position of the drive system 50 and the closed position corresponds to the disengaged configuration of the drive system.

In the open position a tension spring 106 biases the hook 100 against a hook stop 108. The external locking device 93 further includes a locking lever 110 pivoted at one end 112 and having a roller 114 at its opposite end. In the open position the roller 114 rests external to a cam portion 116 of the hook. As the pin 104 moves into the jaws of the hook 100 the hook rotates about pivot 102 until the roller 114 at the end of the locking lever 100 is pulled by the tension spring 106 into engagement with the cam portion 116 of the hook. Once the locking lever 110 engages the hook 100 the pin 104 is held captive by the hook 100 and cannot move out of the jaws of the hook 100 until the locking lever 110 is released.

An unlocking actuator 118 is arranged to extend into engagement with the locking lever so as to rotate the locking lever 110 anticlockwise as viewed in FIG. 12 about pivot axis 112 until the roller 114 moves out of the cam portion 116 of the hook allowing the hook 100 to rotate about pivot 102 to the open position shown in FIG. 11 and thus permitting movement of the pin 104 out of the jaws of the hook 100. The locking device 93 further comprises a proximity sensor 120 and target 122 for monitoring the position of the locking lever 110.

By contrast with the self-locking actuator described previously, the external locking device 93 is insensitive to failure of the positioning actuator and the locking mechanism may be visually inspected. Furthermore, it is expected that the external locking device 93 is more robust and therefore more reliable than the self-locking actuator 58A. The external locking device 93 shares the same advantages as the self-locking actuator in terms of the ability to lock the drive system 50 in the disengaged (second) configuration. Nevertheless, the provision of an external locking device may be heavier than the self-locking actuator.

In the embodiment shown in FIGS. 10 to 12 the positioning actuator 58 and the unlocking actuator 118 of the locking device 93 are both hydraulically actuated. Advantageously the unlocking actuator 118 may be directly connected to the hydraulic lines 95 supplying the positioning actuator so that no additional control of the unlocking actuator 118 is required. When the positioning actuator 58 is commanded to retract so as to engage the drive system 50 the unlocking actuator 118 releases the drive pinion 60 to pivot about pivot axis 57.

It will be appreciated that in the embodiment shown in FIG. 10 the leaf spring 89 of the FIG. 8 embodiment or the torsion spring of the embodiment of FIGS. 2 to 6, may be used as an alternative to the compression spring 87. Furthermore, it will be appreciated that the actuator 58 may be a back-drivable electrohydraulic actuator or an electromechanical actuator as an alternative to the hydraulic actuator shown. Similarly, the unlocking actuator 118 may be an electrohydraulic actuator or an electromechanical actuator instead of the above described hydraulic actuator.

As an alternative to a dual acting hydraulic positioning actuator, a single acting actuator (single hydraulic supply) may be used leaving the full section side of the positioning actuator to breathe through a liquid tight, gas permeable membrane allowing the actuator full section to vent to atmosphere but preventing water and contaminant ingress. Nevertheless, it should be noted that moist air can enter the actuator and materials have to be carefully selected to avoid corrosion and cope with formation of ice during flight due to condensation of moist air.

Figure 14:
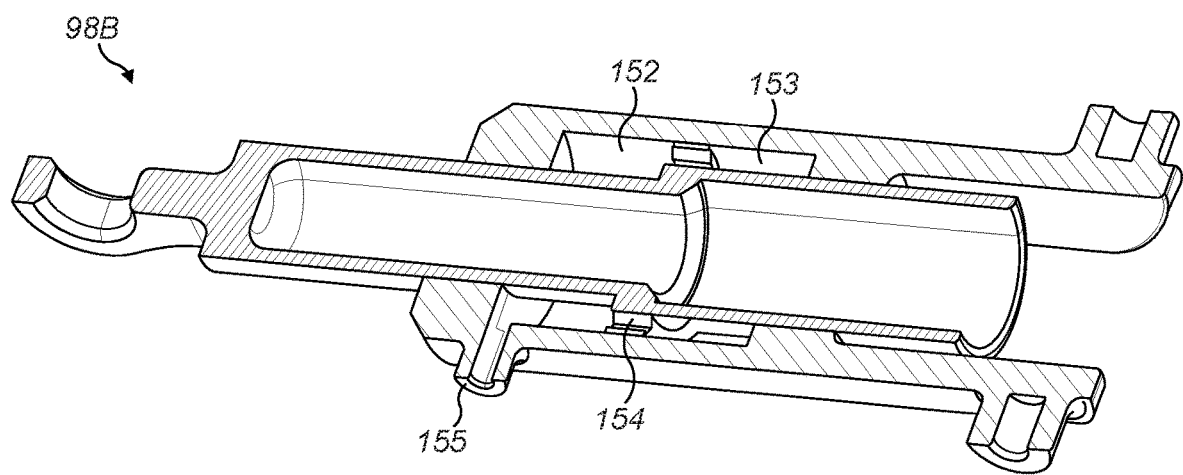
FIG. 14 shows a partially cut away isometric view of the positioning actuator of FIG. 13.

A further alternative positioning actuator is shown in FIGS. 13 and 14, which has two annular sections having unequal cross sectional areas configured in such a way that the actuator can be retracted with a single hydraulic line (single acting).

The actuator 58B comprises two rods 150, 151 allowing the piston to have two annular sections 152, 153. The piston features hydraulic passages 154 allowing both sides of the piston to be pressurized using a single hydraulic port 155. Both rods 150, 151 have different diameters to balance the effective annular section of the actuator in such a way as to be able to retract when pressure is applied. The presence of an additional rod means that the cylinder features two seal heads and two sets of seals.

The positioning actuator 58B may replace any of the positioning actuators 58, 58A described above.

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system including
a motor operable to rotate a drive pinion, and
a driven gear adapted to be mounted to the wheel,
wherein the drive system has
a first configuration in which the drive pinion is capable of meshing with the driven gear to permit the motor to drive the driven gear and
a second configuration in which the drive pinion is not capable of meshing with the driven gear, and
the drive system further comprises a linear positioning actuator for moving the drive pinion relative to the driven gear, wherein the positioning actuator has a first end and a second end,
the first end having a pivotal connection with a pivot axis spaced at a fixed distance from an axis of rotation of the driven gear, and
the second end having a pivotal connection with a pivot axis spaced at a fixed distance from an axis of rotation of the drive pinion and
further comprising a locking device external to the positioning actuator for locking the drive system in the second configuration.

2. A drive system according to claim 1, wherein the positioning actuator is back-driveable.

3. A drive system according to claim 1, wherein one of the drive pinion and the driven gear comprises a sprocket and the other of the drive pinion and the driven gear comprises a series of rollers arranged to form a ring, each roller being rotatable about a roller axis at a fixed distance from an axis of rotation of the drive pinion or driven gear, respectively.

4. A drive system according to claim 1, wherein the wheel is driveable for taxiing the aircraft on the ground and/or spinning-up the wheel prior to landing.

5. A drive system according to claim 1, wherein the motor is a motor/generator which, when operating as a generator, is configured to apply a braking torque to the wheel.

6. An aircraft landing gear having a drive system according to claim 1.

7. A drive system according to claim 1, wherein the positioning actuator includes an hydraulic cylinder.

8. A drive system according to claim 7, wherein the hydraulic cylinder is dual acting.

9. A drive system according to claim 7, wherein the hydraulic cylinder is single acting.

10. A drive system according to claim 9, wherein the hydraulic cylinder has an annular section on one side of a piston and a cylindrical section on the other side of the piston, and the cylindrical section is un-pressurised.

11. A drive system according to claim 10, wherein the un-pressurised section is vented via a liquid tight gas permeable membrane.

12. A drive system according to claim 9, wherein the hydraulic cylinder has a first rod and a second rod forming two annular sections between the first and second rods, the two annular sections are fluidly coupled to a single hydraulic port.

13. A drive system according to claim 12, wherein the two annular sections have dissimilar areas.

14. A drive system according to claim 1, wherein the positioning actuator is a self-locking actuator.

15. A drive system according to claim 14, wherein the self-locking actuator is arranged to lock the drive system in the second configuration.

16. A drive system according to claim 1, further comprising an unlocking actuator arranged to release the locking device.

17. A drive system according to claim 16, wherein the unlocking actuator is configured to release the locking device when the positioning actuator is commanded to move the drive pinion from the second configuration to the first configuration.

18. A drive system according to claim 16, wherein the locking device includes a mechanical locking lever.

19. A drive system according to claim 16, wherein the unlocking actuator includes an hydraulic cylinder.

20. A drive system according to claim 19, wherein the positioning actuator includes an hydraulic cylinder, wherein the hydraulic unlocking actuator and the hydraulic positioning actuator are coupled to a common hydraulic supply.

21. A drive system according to claim 1, wherein the locking device includes a mechanical locking lever.

22. A drive system according to claim 21, wherein the locking device includes a hook pivotally mounted on the aircraft landing gear and a pin spaced at a fixed distance from the axis of rotation of the drive pinion, wherein the hook is moveable between a locked position in which the pin is held captive by the hook, and an unlocked position in which the pin moves relative to the hook.

23. A drive system according to claim 22, further comprising a latch moveable between a locked and an unlocked position, where the latch in the locked position engages the hook and prevents pivotal movement of the hook, and the latch in the unlocked position permits pivotal movement of the hook.

24. A drive system according to claim 23, further comprising an unlocking actuator arranged to release the locking device, wherein the unlocking actuator is coupled to the latch for disengaging the latch from the hook.

25. A drive system according to claim 1, further comprising a biasing element for biasing the drive system to the second configuration.

26. A drive system according to claim 25, wherein the biasing element includes at least one spring.

27. A drive system according to claim 26, wherein the spring is a leaf spring.

28. A drive system according to claim 26, wherein the spring is a compression spring.

29. A drive system according to claim 28, wherein the compression spring is restrained by a guide to avoid buckling of the spring.

30. A drive system according to claim 1, wherein the driven gear is adapted to be mounted to a hub of the wheel.

31. A drive system according to claim 30, wherein the driven gear is adapted to be mounted to an outer rim of the hub.

32. A drive system according to claim 1, wherein the drive system is supported by bracket which is rigidly connected to an axle, main fitting or slider part of the landing gear.

33. A drive system according to claim 32, when the bracket includes two lugs comprising half-moon clamps to permit ready attachment and detachment of the bracket.

34. A drive system for rotating a wheel of an aircraft landing gear, the drive system including
a motor operable to rotate a drive pinion,
a driven gear adapted to be mounted to the wheel,
wherein the drive system has
a first configuration in which the drive pinion is capable of meshing with the driven gear to permit the motor to drive the driven gear such that the drive system is engaged, and a second configuration in which the drive pinion is not capable of meshing with the driven gear such that the drive system is disengaged, wherein the drive system further comprises a linear positioning actuator for moving the drive pinion relative to the driven gear, wherein the positioning actuator has a first end and a second end, the first end having a pivotal connection with a pivot axis spaced at a fixed distance from an axis of rotation of the driven gear, and the second end having a pivotal connection with a pivot axis spaced at a fixed distance from an axis of rotation of the drive pinion, and wherein the drive system further comprises a locking device external to the positioning actuator for locking the drive system in the second disengaged configuration.

35. A drive system for rotating a wheel of an aircraft landing gear, the drive system including a motor operable to rotate a drive pinion, and a driven gear adapted to be mounted to the wheel, wherein the drive system has a first configuration in which the drive pinion is capable of meshing with the driven gear to permit the motor to drive the driven gear such that the drive system is engaged, and a second configuration in which the drive pinion is not capable of meshing with the driven gear such that the drive system is disengaged, and wherein the drive system further comprises a linear positioning actuator for moving the drive pinion relative to the driven gear, wherein the positioning actuator has a first end and a second end, the first end having a pivotal connection with a pivot axis spaced at a fixed distance from an axis of rotation of the driven gear, and the second end having a pivotal connection with a pivot axis spaced at a fixed distance from an axis of rotation of the drive pinion, wherein the drive system further comprises a locking device external to the positioning actuator for locking the drive system in the second disengaged configuration, and an unlocking actuator arranged to release the locking device, such that the positioning actuator cannot move the drive pinion relative to the driven gear and put the drive system in the first engaged configuration until the unlocking actuator releases the locking device.

* * * * *